United States Patent [19]

Ernster

[11] 4,363,820

[45] Dec. 14, 1982

[54] PROCESS FOR PREPARING CANNED TUNA FISH

[76] Inventor: John H. Ernster, 5658 Ravenspur, Rancho Palos Verdes, Calif. 90274

[21] Appl. No.: 350,319

[22] Filed: Feb. 19, 1982

Related U.S. Application Data

[63] Continuation-in-part of Ser. No. 179,771, Aug. 20, 1980, abandoned.

[51] Int. Cl.$^3$ .............................................. A23B 4/14
[52] U.S. Cl. ................... 426/257; 426/268; 426/325; 426/332; 426/407; 426/643; 426/652; 426/657
[58] Field of Search ................ 260/119, 120; 426/129, 426/131, 257, 268, 324, 325, 332, 580, 643, 652, 657, 407, 418, 524

[56] References Cited

U.S. PATENT DOCUMENTS

| | | | |
|---|---|---|---|
| 2,271,272 | 1/1942 | Minde | 426/643 |
| 3,118,777 | 1/1964 | Lavck et al. | 426/652 |
| 3,620,767 | 11/1971 | Swartz | 426/643 X |
| 3,928,652 | 12/1975 | Lanter | 426/643 |
| 4,055,555 | 10/1977 | Badertscher | 426/657 X |
| 4,126,607 | 11/1978 | Eastin | 260/119 |
| 4,213,896 | 7/1980 | Davis | 426/657 X |
| 4,218,490 | 8/1980 | Phillips et al. | 426/643 X |

Primary Examiner—Arthur L. Corbin
Attorney, Agent, or Firm—K. H. Boswell; Edward D. O'Brian

[57] ABSTRACT

A process and a composition used in preparing canned tuna fish which results in the canned tuna having improved product characteristics. Casein is treated with alkali metal hydroxide and a quantity of water. The treated casein is placed in a sealable container with a quantity of untreated tuna fish flesh. After sealing the container the container is heat treated at a temperature to react the treated casein with the tuna flesh and to prevent spoilage of the flesh, the temperature of treatment being governed by that required to prevent spoilage of the flesh. The sealed container, upon cooling, can be stored and the tuna fish utilized in a normal manner upon opening the container.

11 Claims, No Drawings

PROCESS FOR PREPARING CANNED TUNA FISH

CROSS REFERENCE TO RELATED APPLICATION

This application is a continuation in part of my application entitled "Composition and Process Used In Preparing Canned Tuna", Ser. No. 179,771, filed Aug. 20, 1980, now abandoned, the entire contents of which are herein incorporated by reference.

BACKGROUND OF THE INVENTION

This invention is directed to a process and a composition used in that process for treating tuna fish flesh during the canning of the same. The composition utilized in the process is based upon a product formed between casein, an alkali hydroxide, and water.

Canned tuna, when sold in this country, must be processed under certain strict guidelines set forth by the F.D.A. These guidelines govern the grading of tuna according to the particle size of the pieces of flesh, the color of the flesh, the addition of additives to the tuna, as well as other criteria. For different sizes of cans noted to contain a certain amount of contents, the amount of tuna making up these contents is also governed.

Allowable as additives to the canned tuna are certain levels of sodium chloride, monosodium glutamate, hydrolized protein, spices and/or oils. Certain of these ingredients tend to interact with the tuna flesh to alter the flavor and/or physical properties of the flesh. Thus, hydrolized protein may be added to the can in order to bind the smaller particles of the flesh into a more coherent mass. Economics preclude addition of more costly protein than the protein of the tuna flesh itself as an additive to the tuna. For this reason, the protein generally used in the processing of tuna is of a vegetable origin. Typically, vegetable extracts from beans, cabbage, carrots, etc., are therefore added as a vegetable broth to the tuna in amounts not in excess of that amount of pressed weight of tuna as follows: the quantity of tuna remaining upon compression with a pressure of 1500 psi for 30 seconds. Of course, the absolute quantity remaining depends upon the can size which is tested.

In processing the tuna flesh, water, of course, can also be added in prescribed amounts. Upon using the contents of a can, normally the consumer must drain off either a processing oil or a processing water. This, of course, detracts from the absolute usable weight of product from a can. Further, in many instances, depending on the species of tuna being processed and certain processing factors, the opened can of tuna may exhibit a very strong, fishy odor. This further detracts from the consumer acceptability of the tuna. Because of the F.D.A. regulations limiting what can be added to the canned tuna, it has heretofore been impractical to effectively manage these problems.

BRIEF SUMMARY OF THE INVENTION

In view of the above, it is a broad object of this invention to provide for a process and a composition of matter useful in said process which improves certain product parameters of canned tuna. Included as part of this object would be better retention of natural liquids and processing liquids in the canned tuna, reduction and/or elimination of the fish odor and metallic taste of the canned tuna, lightening of the color of the canned tuna, improved shelf life, and improved cake properties of the tuna. It is a further object to limit the loss of weight of a pressed cake of tuna by unifying the content of the pack tuna can such that it is not separable upon being subjected to pressurization.

These and other objects are achieved in a process for preparing and storing tuna fish flesh for consumption which comprises treating casein with an alkali hydroxide in the presence of water, adding a quantity of the product of the alkali hydroxide treated casein, a quantity of water, and a quantity of tuna fish flesh to a sealable container, sealing said container, heat treating said sealed container at a temperature sufficient to prevent spoilage of said flesh and cooling said container.

The combination of said casein, said compound and said water would have a pH of at least 8.5. Preferably, the pH of said combination would be at least 10.

Preferably, a further quantity of water would be added to said sealable container prior to sealing said container. Preferably, when said casein is treated with said alkali hydroxide, said alkali hydroxide would be as an aqueous solution. The ultimate quantity of water contained in said sealable container prior to sealing could come, in part, from said aqueous solution of said alkali hydroxide and in part from water retained on said casein as a result of the production of said casein from acid precipitation, and in part by additional water added to said sealable container, or combinations thereof.

Preferably, said alkali hydroxide is sodium hydroxide and said sodium hydroxide is added to said casein as an aqueous solution. Said aqueous solution would be of a concentration sufficient to provide at least 4% sodium hydroxide by weight of the anhydrous casein. Preferably, at least an amount of water equal to at least 10% by weight of the weight of the anhydrous casein is utilized; however, a more preferred amount of water would be at least 12.5%. Thus, the preferred product formed by said sodium hydroxide treatment of said casein would contain a quantity of water of at least 10% by weight of the anhydrous weight of said casein and a quantity of sodium hydroxide of from about 4% to about 10% by weight of the weight of the anhydrous casein, and water.

Preferably, the product from said casein and said sodium hydroxide is added at from about 2.5 grams to about 5 grams dry weight basis per each 6½ oz. of the total contents of said container. A more preferred range would be from about 3.0 grams to about 4.0. grams.

The invention set forth in this specification utilizes certain principles and/or concepts as are specifically set forth and claimed in the claims appended to this specification. Included in this specification are illustrative examples of these concepts. Those skilled in the chemical and food processing arts will realize that these illustrated examples could be modified without departing from the scope of the claims. For this reason this invention is not to be construed as being limited to the examples, but the scope of this invention is to be construed by the claims.

DETAILED DESCRIPTION

It is a common accepted biochemical principle that animal derived protein is of a generally superior nature compared to vegetable derived protein. It is also an ecological principle that animal derived protein requires more enrgy input to by synthesized and thus is more economically expensive than vegetable derived protein. As a filler, carrier, and/or binder, vegetable protein is generally therefore used, the economic principle being superior to the nutritional principle. Hydrolized protein is an acceptable additive to canned tuna.

In certain areas of the world there is an excess of cow's milk available beyond that which is consumed by the local population. This excess of milk can be utilized prior to spoilage by dehydrating the same to form powdered milk, or by separation of the milk components.

Casein is the principle protein of bovine milk. By acidification to pH 4.7 casein can be isoelectrically precipitated out of solution. This is sometimes done by using in situ bacterial produced lactic acid, and therefore the casein so derived is in reality a mixture of several related proteins designated as alpha, beta, delta, and kappa casein. The majority of the weight of the precipitated casein is in the alpha, beta and kappa fractions. The alpha, beta and kappa caseins are phosphoproteins, whereas the delta fraction contains little or no phosphorous. Of the three phosphoproteins in casein, the alpha and beta casein are the richest in phosphorous.

The acid precipitated caseins ar very cationic in nature. Generally during the production of the acid precipitated casein an anhydrous product is not achieved, but instead a product which retains 9 to 10 percent water is achieved. Since the presence of water is not detrimental to the practice of this invention, but in fact is useful, the precipitated casein containing a small amount of water is preferred for practice of the invention.

I have found that by treating the acid precipitated casein with sodium of potassium hydroxide, preferably sodium hydroxide, in the presence of water, that the cationic nature of the casein is changed and the casein is modified such that it has properties which are superior to the properties of vegetable derived proteins for the processing and production of canned tuna. After so treating the casein with the alkali hydroxide, the resulting treated casein does not exhibit certain properties of untreated casein, such as the ability to be precipitated at high temperatures. Further, the treated casein shows a partial anionic character when subjected to electrophoresis at high pH, as well as changes in the amount of protein nitrogen compared to non-alkali metal hydroxide treated casein.

While I do not wish to be bound by theory, it is my belief that treatment of the acid precipitated casein with the alkali hydroxide is in fact a hydrolysis reaction. It is not simply a caseinate salt formation, but involves a hydration-denaturization reaction. As will be evident below, a minimum amount of water must be present during such treatment. In any event, the hydrolyzed protein which is produced upon said treatment is capable of reducing the normally fishy smell and flavor of canned tuna fish, lightening or whitening the color of the flesh of the tuna fish, and causing the protein of the fish to hydrate and bind together, forming a better cake. Further, a flavor phenomena similar to that produced by monosodium glutamate is exhibited, and the resultant prepared tuna is subjectively considered by food experts to be a superior product. The presence of the treated casein more tightly locks the natural fish juices to the fish protein, preventing separation of the same. This decreases the necessity of the consumer separating those natural juices upon using the tuna, and further, since the natural juices are in fact locked to the protein, a higher weight cake is obtained upon subjecting the contents of a can of tuna to a standardized pressure test.

As noted above, in practicing the invention, acid precipitated casein is preferred, both because of its availability and because of its retention of moisture upon precipitation. The 9 to 10 percent moisture retained on this precipitated casein contributes water for the reaction of the casein. Normally, because of the presence of the 9 to 10 percent moisture in the casein, it would be considered that this would be the minimum amount of water present for the reaction.

It is conceivable that a lower amount of water than the above describe 9 to 10 percent could be utilized. However, it is believed that only a partial reaction would take place with a certain amount of the casein still present in an unreacted form. As will be demonstrated below, the casein itself does not produce the same results as does the treated casein of my invention. While the presence of the unreacted casein, from a consumption and health point of view, is not detrimental, from an economic point of view it contributes nothing to the improved properties of the tuna, and thus, inclusion of the unreacted casein is economically disadvantageous. This therefore sets a practical lower limit for moisture of about 9 to 10 percent for achieving the desired final tuna product.

The upper limit of the amount of water present during the sodium hydroxide treatment of the casein is not deemed to be limiting. It is not governed by the sodium hydroxide-casein reaction, but is governed by the total liquid content of the sealed container after addition of the treated casein to the tuna flesh. As a practical matter, treatment of the casein with sodium hydroxide at a lower water level facilitates reacting the casein with the sodium hydroxide. Thus, as a practical matter, the percentage of water present during the treatment of the casein with the alkali hydroxide is based upon a convenient volume of a conveniently manipulatable sodium hydroxide solution plus the amount of moisture normally retained in the precipitated casein.

As shown in the examples below, 60% sodium hydroxide solution results in a product from the casein-sodium hydroxide reaction which is powdery and free flowing, and as such can be easily packaged and stored and/or conveniently weighted out in appropriate amounts for addition to the tuna flesh as is described below.

In one example shown, a moisture level of 17% was calculated in the final treated casein product. This, of course, does not represent any limits on the water which can be utilized, but simply represents a convenient working amount for producing a powdery sodium hydroxidce treated casein product. As is shown below, in an example illustrating the preparation of the final tuna flesh product of the invention, 33 mls of water (approximately 33 grams of water) is added to the 3.5 grams of the sodium hydroxide treated casein product. This, of course, represents a many fold amount of water on a weight basis compared to the sodium hydroxide treated casein product. Theoretically, this amount of water could be present during the treatment of the casein with the sodium hydroxide. However, from a physical point of view in handling the product of the sodium hydroxide treated casein, a much lower amount of water is preferred. As noted above, sodium hydroxide is the preferred alkali hydroxide of the invention. The potassium hydroxide counterpart also has the required basic properties. However, it is generally less available and therefore more expensive.

In performing the reaction of the casein with the sodium hydroxide, it is preferred to utilize the sodium hydroxide in solution form. Powdered sodium hydroxide could be added directly to the acid precipitated casein containing 9 to 10 percent water. However, due to the hydroscopic nature of sodium hydroxide, physical performing of this type of reaction is difficult. As such, sodium hydroxide in solution form is preferred.

The amount of the preferred sodium hydroxide with respect to the unreacted casein, based on the anhydrous weight of that casein, would vary from a minimum of from about 4 to 10 percent by weight of the sodium hydroxide per weight of the anhydrous casein. At the lower level, pH of the reaction mixture just after initiation would be around 8.5. It has been found necessary to have the pH of the reaction mixture at least about 8.5 or greater in order to achieve the hydrolyzed casein of this invention. As is shown below, the reaction mixture tends to have physical properties which result in more difficult stirring and handling at this level. As the amount of sodium hydroxide is decreased, unreacted casein can be left in the final product of the sodium hydroxide-casein reaction. As is noted elsewhere, this is economically disadvantageous, and as such, is not preferred.

As the sodium hydroxide concentration exceeds about 10%, reaction parameters also change, resulting in disadvantageous reaction conditions. The reaction slows down, which of course is uneconomical, due to prolonged use of equipment and labor. Because of these factors, 10 percent is considered to be a practical upper limit for commercial practice of the sodium hydroxide-casein reaction. It is, of course, realized that higher sodium hydroxide concentrations could be utilized in non-commercial processors, wherein economic considerations of the reaction are not so critical.

A more preferred range of the sodium hydroxide would be from about 6 to about 7 percent of the weight of the anhydrous casein. At the 6 percent or slightly greater level, a reaction pH of greater than 10 is achieved.

The reaction of the sodium hydroxide with the casein is moderately exothermic. The reaction, however, can be accelerated by the addition of heat.

As examples of the formation of the alkali hydroxide treated casein, the following illustrative examples are shown.

EXAMPLE 1

689 lbs. of precipitated casein was placed in a blender capable of producing a high shear. 100 lbs. of a 60% solution of sodium hydroxide at a starting temperature of 55° F. was injected into the blender with stirring. After mixing for two minutes. it was noted that the pH of the reaction suspension was approximately 12. After approximately ten minutes of stirring, the reaction temperature had increased to 80° F., and after 45 minutes it was 100° F. The reaction was judged complete after 45 minutes. Initially, stirring was very easy, and at the completion of the reaction a powder having good pouring properties resulted. It was calculated that this powder contained 17% moisture, based on an approximate 10% moisture level in the starting casein.

EXAMPLE 2

In this example, reaction conditions were as described in Example 1 above. 689 lbs. of casein was treated with 65 lbs. of a 60% solution of sodium hydroxide solution. Initial reaction temperature was 60° F., and after 40 minutes of stirring it had climbed to 105° F. A pH of 10.33 was measured after several minutes of stirring. As above, a flowable powder was produced.

EXAMPLE 3

In this Example, reaction conditions were as described in Example 1 above. 689 lbs. of casein was treated with 44 lbs. of 60% sodium hydroxide solution. Initial temperature measurement of 60° F. resulted, with a 90° F. temperature reading at the conclusion of the reaction, calculated to be forty minutes. pH after several minutes of stirring was measured at 8.65. The reaction mixture of this example was more viscous than in Examples 1 and 2 above. It was subjectively concluded that reaction was complete at an earlier time period than in Examples 1 and 2 above.

In the Examples above, upon treating the casein with the sodium hydroxide, an exothermic reaction took place, with swelling of the casein within the blender. Upon completion of the reaction, the swelled casein collapsed to a certain degree, indicating the conclusion to the reaction.

Preferably, to facilitate the handling of the hydrolyzed casein after it is formed, the hydrolyzed product is taken up in water and is heated at about 150° to 180° F. to form a conveniently manipulated solution. Normally, an aqueous solution would be used having a concentration of 12 to 15 percent by weight of the hydrolyzed casein in water. The limits of this solution are governed by the limits of the amount of water in the final tuna product and the viscosity of an aqueous solution of this hydrolyzed casein. Normally, a lower concentration limit of about 12 percent would allow introduction of a suitable amount of the hydrolyzed casein without unduly overdiluting the canned tuna product with water beyond that allowed by the F.D.A. regulations. The lower limit then is governed not by chemical properties, but by arbitrative regulations set up for a consumer product.

The 15 percent upper limit noted in the above paragraph is based on manageability of the hydrolyzed casein in water. Above about 15 percent, a solution of hydrolyzed casein in water increases in viscosity such that ease of measuring the appropriate aliquots to be introduced into each can of tuna becomes the inhibitory factor. For use in automatic machinery, an essentially free-flowing solution susceptible to repetitive dispensing of a predetermined quantity within reasonable tolerance limits determines the upper limit of the viscosity of the hydrolyzed casein solution. The upper 15 percent is therefore governed by these factors.

It is not necessary, however, to actually introduce into the tuna can the hydrolyzed casein in solution form. The hydrolysis reaction product of the sodium hydroxide-casein reaction is a solid having unique properties including allowing dispensing of appropriate predetermined measures directly into an empty can prior to filling the can with the tuna flesh. The required quantity of this solid can be so introduced into the can prior to or after the introduction of an appropriate amount of tuna flesh. After sealing the can in a manner appropriate with practices used in the canning industry, the can is subjected to autoclaving or retorting as is also practiced in the canning industry to preserve the tuna flesh. Normally, the can is heated in the autoclave to about 230° to about 260° F. At this temperature, solubility of the hydrolyzed casein in the water present is ensured. This solution is totally analogous to that of preforming a solution wherein the hydrolyzed casein is placed in solution prior to the introduction into the can. The preformed solution of the casein, however, is preferred in that it ensures complete solubility of the hydrolyzed casein prior to any contact with the tuna flesh.

In admixing with tuna flesh in packing the tuna flesh, the hydrolyzed casein product from the sodium hydroxide casein reaction would be added to the tuna flesh in the container either as a dilute solution in water, or as a solid, as follows. The hydrolyzed casein is used on a dry weight basis on the range of about 2.5 grams to 5 grams per each 6½ oz. of the total contents of the can. Preferably, about 3.0 to 4 grams will be used, with the optimum amount being 3.5 grams for this size can. The total contents of the can at least includes hydrolyzed casein, tuna flesh and any topping, water, or vegetable broth.

Following the appropriate hydrolysis procedures of the casein as outlined above, the process of this invention can be summarized as follows: treating casein with an alkali hydroxide in the presence of water, adding a quantity of the product of the casein-alkali hydroxide, a quantity of water and a quantity of tuna fish flesh to a sealable container, sealing the container and then heat treating in a manner acceptable to suitably existing standards to prevent spoilage of the flesh, cooling the container prior to distribution, usage, etc.

EXAMPLE 4

The following is given as an illustration of the packaging of tuna flesh utilizing the treated casein product illustrated above. A 25 ml aliquot of a 14 percent solution of the treated casein in water (containing about 3.5 grams of the treated casein) is added to a container containing about 5¼ oz of tuna flesh. This is topped with approximately 33 mls of water to fill the can. The can is sealed and retorted in an autoclave at about 240° F.

Addtional additives can be added to the tuna flesh prior to sealing and heat processing the can. Included as additives might be sodium chloride. If sodium chloride is added, of course, adjustments of its concentration would reflect that sodium ion is also contributed from the sodium hydroxide. Normally, this would result in much less sodium chloride being added. In practicing the preferred embodiment of the invention, standardization of the sodium chloride level requires approximately 1.2 to 1.3 percent sodium chloride on a weight bases per 6½ oz. can contents.

To demonstrate the improved properties of tuna flesh prepared by treatment with the above described sodium hydroxide treated casein, the following tests were run, comparing tuna so treated with casein or other derivatives of casein and related proteins plus a control. Six tests were run. Sample 1 utilized the treated casein of my procedure. Sample 2 utilized sodium caseinate, and sample 3 casein itself. Sample 4 utilized lactalbumin as an example of a related protein, and sample 5 utlized casein treated with trisodium phosphate at pH 7.5. The control, sample 6, did not utilize any phosphoprotein therein.

Each of the test proteins was solubilized with water forming a 14 percent solution. The protein solutions were then added to freshly packed yellow fin tuna utilizing 25 mls of the protein solution in a 307×113 mm can. 25 cans each were processed for each of the protein variables. The cans were then topped off with vegetable broth, steamed and retorted for 75 minutes at 250° F. After cooling, the cans were allowed to sit for seven days at room temperature to achieve total equilibrium.

The cans of the test proteins and the control were opened and allowed to drain open-ended over a 20 mesh screen into a graduated cylinder to collect all free draining liquid. The average amount of liquid collected for each of the proteins and the control is tabulated as follows:

TABLE I

| VARIABLE | FREE LIQUID (ml) |
|---|---|
| Treated Casein of the Invention | 14.5 |
| Sodium Caseinate | 23.0 |
| Casein | 25.5 |
| Lactalbumin | 24.5 |
| Casein Trisodium Phosphate (pH 7.5) | 23.0 |
| Control | 25.0 |

As is obvious from Table I, above, a significant difference in the amount of free liquid draining from the cans treated as per this invention was achieved. At least 40% less liquid drained off of the tuna processed as per this invention as compared to the next closest of the proteins. In one instance, casein itself, more liquid drained from the test cans than from the control.

I claim:

1. A process for preparing and storing tuna fish flesh for consumption which comprises:
   treating casein with a compound, selected from the group consisting of sodium hydroxide and potassium hydroxide, in the presence of water;
   adding a quantity of the treated casein and a quantity of tuna fish flesh to a sealable container;
   sealing said container;
   heat treating said sealed container at a temperature sufficient to prevent spoilage of said flesh; and then cooling said container.

2. The process of claim 1 wherein:
   the combination of said casein, said compound and said water has a pH of at least 8.5.

3. The process of claim 2 which comprises:
   adding a further quantity of water to said sealable container prior to sealing said container.

4. The process of claim 3 wherein:
   said combination of said casein and said water has a pH of at least 10.

5. The process of claim 4 wherein:
   said compound is sodium hydroxide.

6. The process of claim 5 wherein:
   the weight of the sodium hydroxide treated casein is from about 2.5 grams to about 5 grams dry weight basis per each 6½ oz of the contents of said container.

7. The process of claim 6 wherein:
   the weight of the sodium hydroxide treated casein is about 3.0 to about 4.0 grams.

8. The process of claim 7 wherein:
   said weight is about 3.5 grams.

9. The process of claim 7 wherein:
   said casein is treated with an aqueous solution of said sodium hydroxide.

10. The process of claim 7 wherein:
   said sealed container is heated at a temperature of from about 230° F. to about 260° F.

11. The process of claim 5 wherein:
   said casein is treated with an aqueous solution of said sodium hydroxide.

UNITED STATES PATENT AND TRADEMARK OFFICE
CERTIFICATE OF CORRECTION

PATENT NO. : 4,363,820

DATED : December 14, 1982

INVENTOR(S) : John H. Ernster

It is certified that error appears in the above-identified patent and that said Letters Patent is hereby corrected as shown below:

Column 2, lines 17, 19, 28, 34 and 43, "preferably" should read --Preferredly--.

Column 3, line 25, delete the words "is achieved".

Column 3, line 21, "ar" should read --are--.

Column 3, line 31, "of" should read --or--.

Column 4, line 52, "hydroxidce" should read --hydroxide--.

Column 5, line 28, "disadvantageous" should read --unadvantageous--.

UNITED STATES PATENT AND TRADEMARK OFFICE
CERTIFICATE OF CORRECTION

PATENT NO. : 4,363,820

DATED : December 14, 1982

INVENTOR(S) : John H. Ernster

It is certified that error appears in the above-identified patent and that said Letters Patent is hereby corrected as shown below:

Column 7, line 47, "on" should read --in--.

Column 7, line 48, "can contents" should read --contents can--.

Signed and Sealed this

Thirtieth Day of October 1984

[SEAL]

Attest:

GERALD J. MOSSINGHOFF

Attesting Officer

Commissioner of Patents and Trademarks